United States Patent [19]

Roberts et al.

[11] Patent Number: 4,868,872
[45] Date of Patent: Sep. 19, 1989

[54] TELEPHONE TONE DETECTOR

[75] Inventors: Melvin J. Roberts, Kanata; Frank Y. Dea, Nepean, both of Canada

[73] Assignee: Mitel Corporation, Ottawa, Japan

[21] Appl. No.: 230,078

[22] Filed: Aug. 9, 1988

[30] Foreign Application Priority Data

Aug. 14, 1987 [CA] Canada ................................. 544585

[51] Int. Cl.$^4$ ............................................. H04Q 9/12
[52] U.S. Cl. .................................. 379/386; 379/283; 340/825.48; 340/825.74
[58] Field of Search ............... 379/386, 372, 165, 258, 379/282, 283, 284, 286, 287; 328/137; 307/524, 525; 340/825.48, 825.73, 825.74

[56] References Cited

U.S. PATENT DOCUMENTS 4,521,647  6/1985  Olson et al. ..................... 379/386 X
4,696,031  9/1987  Freudberg et al. ................. 379/386

*Primary Examiner*—James L. Dwyer
*Attorney, Agent, or Firm*—Antonelli, Terry & Wands

[57] ABSTRACT

A tone detector comprising a circuit for detecting multi-frequency dialing (DTMF) signals applied to an input terminal and for generating a "DTMF present" indicating signal, and a circuit for detecting the presence of supervisory signals applied to the input terminal and for generating a "supervisory signal present" indicating signal. The dialing tones are converted to digital value signals and are preferably stored in a shift register. The digital value signals and the supervisory signals are applied in serial form to an output terminal. The "DTMF present" indicating signal is applied to a "DTMF present" terminal. Accordingly the presence of the "DTMF present" indicating signal can be monitored and thereby indicate whether the signal present on the output terminal is a digital value signal or a supervisory tone present indicating signal. The invention is thus realizable in a significantly reduced pin count integrated circuit chip for use in domestic controlling apparatus to be connected to telephone lines, such as telephone answering machines, utility meter readers, security devices, etc.

7 Claims, 2 Drawing Sheets

TELEPHONE TONE DETECTOR

This invention relates to a tone detector for use in devices attached to telephone lines for detection of multi-frequency dialing tones and supervisory signals.

Tone detectors have been used for many years in telephone switching offices and PABXs to detect dialing tones and supervisory tones. The various tones are usually distinguished by filtering, are subsequently decoded and applied in parallel digital form to a bus from which the coded signals are received by the system processor.

Such tone detection systems require a fair degree of complexity due to their requirement to interface reliably with the switching system processor: hence their requirement to provide a parallel output whereby the system processor can be operated at maximum speed and not be required to be continuously tied up monitoring a slow serial tone decoder interface.

However a new class of tone decoders has become desirable with the popularity of many consumer type telephone products. Such products require a high degree of reliability in tone decoding, but do not require interfacing with a PABX or other telephone switching processor. Requirements for this new class of tone decoders are for example in telephone answering machines, or other domestic household controlling apparatus which interface with the telephone line, such as remote operating appliances, burglar alarms, etc.

For such applications an integrated circuit tone decoder is desirable having a minimum number of interface pins. The present invention accomplishes this objective by providing a circuit having an input which carries all signals, including voice, multi-frequency dialing tone (DTMF) and supervisory tone, and provides a single output terminal which carries a code corresponding to the detected DTMF signals as well as a supervisory tone present signal. A signal is provided to a DTMF present indicating terminal which, if present, indicates that the signal carried by the output terminal is a code corresponding to the DTMF received dialed digit, and, if absent at the same time as a supervisory tone present indicating signal is present, thereby indicates that the signal present at the output terminal is a supervisory tone indicating signal.

Thus the number of terminals or pins requied for the present device is substantially less than that previously required, and is reduced to a single input terminal, a single output terminal, a single "flag" terminal, a shift pulse input terminal, a single clock oscillator terminal if needed, and power supply terminals.

In summary, according to a preferred embodiment the present invention is a tone detector comprising means for detecting multi-frequency dialing (DTMF) signals applid to an input terminal and for generatng a "DTMF present" indicating signal, and means for detecting the presence of supervisory signals applied to the input terminal and for generating a "supervisory signal present" indicating signal. The dialing tones are converted to digital value signals and are preferably stored in a shaft register. The digital value signals and the supervisory signals are applied in serial form to an output terminal. The "DTMF present" indicating signal is applied to a "DTMFpresent" terminal. Accordingly the presence of the "DTMF present" indicating signal can be monitored and thereby indicate whether the signal present on the output terminal is a digital value signal or a supervisory tone present indicating signal.

A better understanding of the present invention will be obtained by reference to the detailed description below, which reference to the following drawings, in which.

Figure 1:
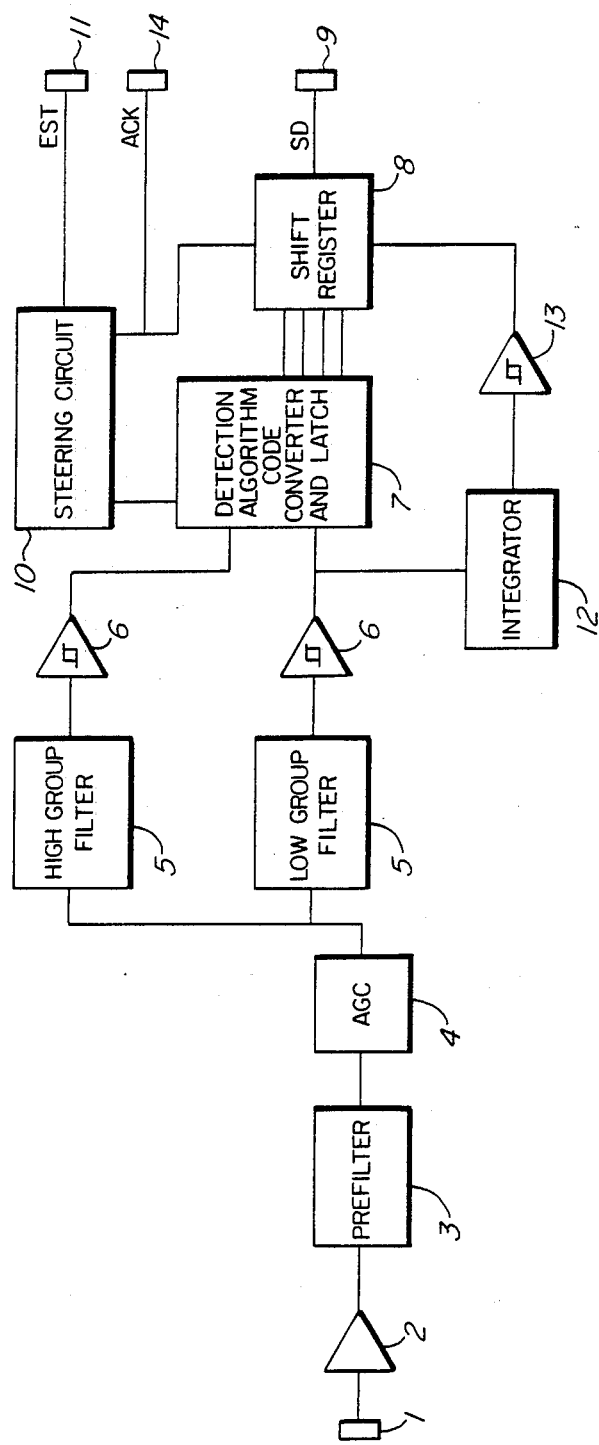
FIG. 1 is a block diagram of the preferred embodiment of the invention.

Turning to the figures, DTMF and supervisory tone (line A of FIG. 2) is applied to input 1, from which it is amplified in amplifier 2, filtered in filter 3 and is applied to automatic gain control circuit 4. In the automatic gain control circuit the amplitudes of the signals are made approximately equal.

The output of the automatic gain control circuit is applied to filters 5, where they are separated into a high frequency tone group and low frequency tone group, since DTMF signals are conventionally dual tone signals. The output signals of filters 5 are applied to Schmitt trigger circuits 6, where they are converted into square wave form, and from where they are applied to a DTMF detector, code converter and latch 7.

DTMF detector, code converter and latch are of conventional construction, for example, counting time between zero crossings of the signals input thereto and averaging the time between zero crossings in order to determine the frequency equivalence in the input signal. Once an acceptable DTMF tone frequency has been determined a digital code signal corresponding to the frequency of the input signal is generated, e.g. by consulting a code stored in a memory. The digital code signal is latched and is applied to a shift register 8 in parallel form where it is stored. The output of the shift register is connected to an output terminal 9.

Upon detection of a valid DTMF tone (which distinguishes from a supervisory tone or other tone) by the detector 7, an enable signal is applied to a steering circuit 10. The steering circuit generates an output pulse for the duration of the enable signal on an EST terminal 11, thereby applying a pulse thereto which is the equivalent of the envelope of the DTMF signal. Since this signal endures for the duration of each DTMF pulse train, the signal at the EST terminal thus constitutes a "DTMF present" indicating signal.

The output signal of the Schmitt trigger 6 connected to the low group filter is applied to an integrator 12, where the energy of the square waves is integrated. The purpose of connecting the integrator to the Schmitt trigger which is at the output of the low group filter is that it is expected that the supervisory tone will fall into the low group bandpass (as will voice signals, etc.). It can alternatively be connected to the output of the automatic gain control circuit 4, following suitable translation into a square wave.

The integrator provides a logical high output signal once the integrated energy has increased to a level above a predetermined threshold. A typical threshold for supervisory tone is 20 milliseconds of integration. It is desirable to have a minimum threshold, but sufficiently great that the output of the integrator should not be caused to toggle with low frequency pulses, such as might be received in the low group of DTMF signals or as low frequency voice or music.

Once the threshold has been exceeded, the output of the integrator goes to high logical level, and only changes to low level following disappearance of the supervisory tone and the stored level in the integrator sags to below the threshold. This is accomplished by applying the integrated signal to the Schmitt trigger 13.

The output of the Schmitt trigger 13 is applied to shift register 8 from which it is applied to output terminal 9.

An acknowledge (ACK) terminal 14 is connected to the shift out control input of shift register 8, and to the steering circuit 10.

As described earlier, the steering circuit 10 applies an envelope signal to EST terminal 11. An external microprocessor, which is not part of the present invention, can monitor the EST terminal 11 and detect the signal appearing thereat which will be in the form indicated in line B in FIG. 2. After a guard time (GT) to ensure that the DTMF present indicating signal as shown in line B in valid, it will apply a sequence of pulses (e.g. 4 pulses) to the ACK terminal 14, a shown in line C of FIG. 2.

Figure 2:
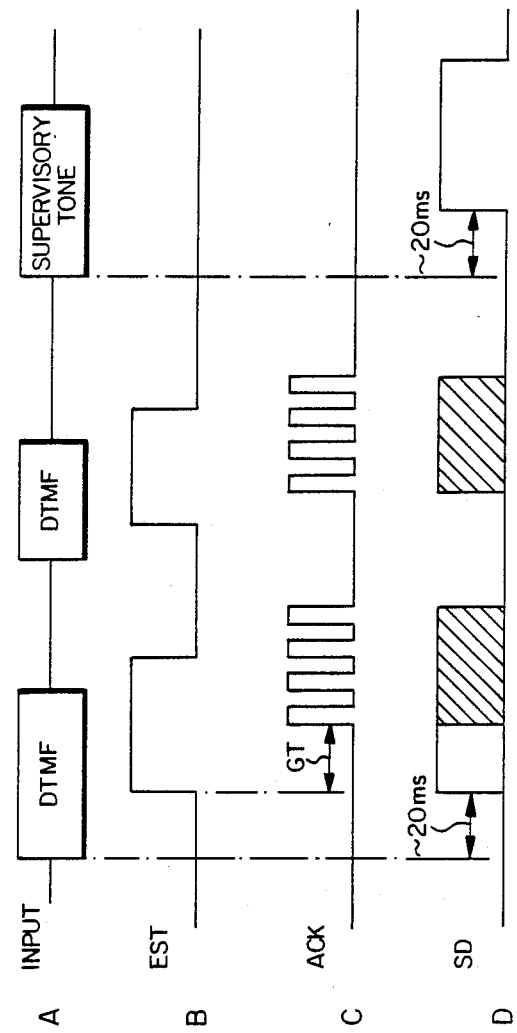
FIG. 2 is a waveform diagram used to illustrate operation of the invention.

With the pulses applied to the shift out input of shift register 8, digital code signals stored in shift register 8 are serially applied to output terminal 9, during the interval shown by the cross-hatched pulses in line D of FIG. 2.

When supervisory tone appears and is integrated in integrator 12, the envelope equivalent (logical high signal) is applied from Schmitt trigger 13 via shift register 8 to the output terminal 9, and appears as the empty pulse, for the interval of the supervisory tone burst shown on line D of FIG. 2. The external microprocessor, monitoring the EST terminal 11 and the output terminal 9 senses the pulse corresponding to the supervisory tone, but no DTMF present indicating signal on the EST terminal 11. The microprocessor thus can determine that the pulse appearing at the output terminal 9 in the absence of a pulse at the EST terminal is a "supervisory signal present" indicating signal, and is not a code corresponding to a DTMF signal. Conversely if a pulse appears on the EST terminal 11 the external microprocessor can logically deduce that the signal appearing on the output terminal 9 is a serial digital code which distinguishes the particular DTMF tone which is being received.

It should be noted that a digital guard interval timing circuit can be connected between the steering circuit and terminal 11, in order to delay providing a pulse thereat until a predetermined period of time passes following the onset of a DTMF burst, in order to avoid initiation by spurious signals received at the input terminal 1.

With the provision of a one pin oscillator (single pin input to ground) for providing a clock to the present circuit, and with an unbalanced input, clearly the present circuit can provide all of the functions of receiving an input signal and indicating which high and low DTMF signals have been received, and that supervisory tone is present, in only a five pin plus power pins integrated circuit package. This is believed to provide a significant cost reduction in circuit complexity and cost, thus allowing such products to be broadly applied to inexpensive domestic devices remotedly controlled from a telephone line.

A person skilled in the art may now conceive of variations of the above-described invention, or other embodiments. All of those which fall within the scope of the claims appended hereto are considered to be within the present invention.

We claim:

1. A tone detector comprising:

(a) means for detecting multi-frequency dialing DTMF signals applied to an input terminal and for generating a DTMF present indicating signal,
(b) means for detecting the presence of supervisory signals applied to said input terminal and for generating a "supervisory signal present" indicating signal,
(c) means for converting the dialing signals to digital value signals,
(d) means for applying the digital value signals and the supervisory indicating signals in serial form to an output terminal, and
(e) means for applying the "DTMF present" indicating signal to a "DTMF present" terminal,
whereby the presence of the "DTMF present" indicatng signal can be monitored and thereby indicate whether the signal present on the output terminal is a digital value signal or a supervisory tone present indicating signal.

2. A tone detector as defined in claim 1 in which the supervisory signal present indicating signal is a constant logical high signal.

3. A tone detector as defined in claim 2 including means for controlling the amplitude of signals appearing at the input terminal, means for integrating the energy of the signals, and for generating the supervisory tone present indicating signal when the integrated energy is in excess of a predetermined threshold.

4. A tone detector as defined in claim 3 in which the DTMF present indicating signal is in a form similar to the envelope of the DTMF signals.

5. A tone detector as defined in claim 1 including a shift register for storing the digital value signals, and means for enabling shifting out of the stored digital value signals to the output terminal upon receipt thereby of shift pulse signals from an external source.

6. A tone detector as defined in claim 4 in which the means for storing digital value signals including a shift register for storing the digital value signals, and means for enabling shifting out of the stored digital value signals to the output terminal upon receipt thereby of shift pulse signals from an external source.

7. A tone detector comprising:

(a) an output terminal for receiving multi-frequency DTMF dialingtones and supervisory tones,
(b) an automatic gain control for receiving said tones and controlling their amplitudes to an approximately constant amplitude,
(c) means for converting said tones to square waves,
(d) means for detecting DTMF dialing tone representations of said square waves and for converting them into digital code signals,
(e) a shift register for receiving and storing the digital code signals, having a shift control terminal,
(f) means for generating envelope signals of the square waves upon detection of the DTMF dialing tone representations of said square waves, and for applying the envelope signals to a DTMF present indicating terminal,
(g) means for integrating the square waves and for applying a supervisory tone present indicating signal to an output terminal,
(h) means for receiving a shift out terminal of the shift register for applying the digital code signals to the output terminal in response thereto,
whereby the presence of the envelope signals on the DTMF present indicating terminal can be monitored and thereby indicate whether the signal present on the output terminal is a digital code signal or a supervisory tone present indicating signal.

* * * * *